United States Patent [19]

Fukumura et al.

[11] Patent Number: 5,674,958
[45] Date of Patent: Oct. 7, 1997

[54] PROCESS FOR (CO)POLYMERIZING VINYL MONOMERS

[75] Inventors: Takumi Fukumura, Asa-gun, Japan; John Meijer, ES Deventer, Netherlands

[73] Assignee: Kayaku Akzo Corporation, Tokyo, Japan

[21] Appl. No.: 397,102

[22] PCT Filed: Sep. 7, 1993

[86] PCT No.: PCT/EP93/02426

§ 371 Date: Apr. 26, 1995

§ 102(e) Date: Apr. 26, 1995

[87] PCT Pub. No.: WO94/06269

PCT Pub. Date: Mar. 17, 1994

[30] Foreign Application Priority Data

Sep. 8, 1992 [JP] Japan ............... 4-264064

[51] Int. Cl.$^6$ ............... C08F 4/34; C08F 4/38; C08F 4/04
[52] U.S. Cl. ............... 526/227; 526/230.5; 526/219.6
[58] Field of Search ............... 526/227, 219.6, 526/230.5

[56] References Cited

U.S. PATENT DOCUMENTS

| | | | |
|---|---|---|---|
| 3,446,831 | 5/1969 | Mageli et al. | 260/453 |
| 3,624,123 | 11/1971 | Lewis et al. | 260/453 R |
| 3,726,847 | 4/1973 | Lewis et al. | 260/92.8 R |
| 4,057,567 | 11/1977 | Friedman et al. | 260/453 RZ |
| 4,063,013 | 12/1977 | Friedman et al. | 526/227 |
| 5,151,482 | 9/1992 | Ikeda et al. | 526/329.7 |

FOREIGN PATENT DOCUMENTS

| | | | |
|---|---|---|---|
| 1 950 536 | 4/1970 | Germany | C07C 73/10 |
| 69 15160 | 4/1970 | Netherlands | C07C 73/00 |
| 69 15160 | 4/1970 | United Kingdom | C07C 73/00 |
| 1104605 | 4/1989 | United Kingdom | C08F 02/18 |
| WO 91/03496 | 3/1991 | WIPO | C08F 4/28 |

OTHER PUBLICATIONS

Yurzhenko, T.I., et al., *Zh. Org. Khim.* 3 (9), 1705–6 (1967) Abstract only.

*Primary Examiner*—Joseph L. Schofer
*Assistant Examiner*—Wu C. Cheng
*Attorney, Agent, or Firm*—Ralph J. Mancini; Louis A. Morris

[57] ABSTRACT

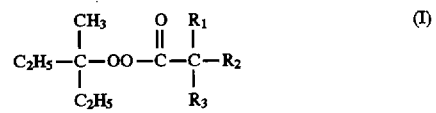

The invention relates to a process for (co)polymerizing vinyl monomers in the presence of a radical polymerization initiator, characterized in that said radical polymerization initiator is a 3-methylpentyl-3-peroxy alkanoate of formula (I) wherein $R_1$, $R_2$ and $R_3$ represent alkyl groups each having at most 9 carbon atoms with the proviso that the total number of carbon atoms of $R_1$, $R_2$ and $R_3$ is at most 11, said 3-methylpentyl-3-peroxy alkanoate being employed in an amount of 0.002 to 2.0 parts by weight, based on 100 parts by weight of monomers present, said process being carried out at a temperature above 20° C. The use of 3-methylpentyl-3-peroxy alkanoates in the present invention surprisingly and unexpectedly results in a higher polymerization velocity, a shortened polymerization time, and an increase in conversion as compared with the results obtained by using other radical polymerization initiators. It has also been found that the obtained polymer has excellent thermal stability and is not affected by odour or coloration. Thus the industrial value of the radical polymerization initiator peroxide of the present invention is remarkably high.

7 Claims, No Drawings

PROCESS FOR (CO)POLYMERIZING VINYL MONOMERS

The present invention relates to a process for (co) polymerizing vinyl monomers in the presence of a radical polymerization initiator.

Various t-alkylperoxy alkanoate compounds have been described as radical polymerization initiators in the (co) polymerization of vinyl monomers.

U.S. Pat. Nos. 3,726,847 and 3,624,123 disclose a long list of t-alkylperoxy esters and their precursors, viz. hydroperoxides. The long list of hydroperoxides includes 3-methyl-3-hydroperoxy pentyne-1, which may also be used as a saturated hydroperoxide. These patent publications suggest that t-alkylperoxy esters can be used in the polymerization of vinyl monomers. Among others, t-butylperoxy pivalate (TBPP), t-butylperoxy neodecanoate (TX23), and α-cumylperoxy neodecanoate (CND) are exemplified. However, 3-methylpentyl-3-peroxy alkanoates are neither exemplified nor preferred.

Dutch patent application 69 15160 discloses the use of t-hexylperoxy alkanoate for the polymerization and/or curing of vinyl monomers. No specifics are given on the structure of this t-hexyl compound. However, from U.S. Pat. Nos. 4,057,567 and 4,063,013 it can be concluded that t-hexylperoxy alkanoate is 2-methylpentyl-2-peroxy alkanoate. These patent publications also disclose the use of 2-methylpentyl-2-peroxyalkanoates in the polymerization of vinyl monomers. Exemplified is 2-methylpentyl-2-peroxy neodecanoate (THPND).

There are several drawbacks to using the disclosed radical polymerization initiators in the (co)polymerization of vinyl monomers. The polymerization activity of TBPP is insufficient and the polymer conversion is relatively low, though the properties of the obtained polymer are satisfactory. It has also been found that the use of THPND results in a low polymer conversion. In addition, CND imparts a peculiar, offensive smell to the polymer due to the presence of decomposition products.

Furthermore, the synthetic resin industry demands reduction of the polymerization time. Although it was attempted to attain this requirement by increasing the amount of initiator, this method appeared to be impracticable, the resulting polymers being coloured.

An object of the present invention is to provide a polymerization process having high polymerization velocity, a short polymerization time, and an increase in conversion. Another object of the present invention is to provide a polymerization process for producing a colourless polymer having no offensive smell.

Therefore, the present invention relates to a process for (co)polymerizing vinyl monomers in the presence of a radical polymerization initiator, characterized in that said radical polymerization initiator is a 3-methylpentyl-3-peroxy alkanoate of the formula (I)

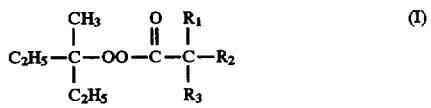

wherein $R_1$, $R_2$ and $R_3$ represent alkyl groups each having at most 9 carbon atoms with the proviso that the total number of carbon atoms of $R_1$, $R_2$ and $R_3$ is at most 11, said 3-methylpentyl-3-peroxy alkanoate being employed in an amount of 0.002 to 2.0 parts by weight, based on 100 parts by weight of monomers present, said process being carried out at a temperature above 20° C.

The use of 3-methylpentyl-3-peroxy alkanoates in the present invention surprisingly and unexpectedly results in a higher polymerization velocity, a shortened polymerization time, and an increase in conversion as compared with the results obtained by using other radical polymerization initiators. It has also been found that the obtained polymer has excellent thermal stability and is not affected by odour or colouration. Thus the industrial value of the radical polymerization initiator of the present invention is remarkably high.

Examples of the 3-methylpentyl-3-peroxy alkanoate of the formula (I) to be used in the present invention include 3-methylpentyl-3-peroxy pivalate (3MPPP), 3-methylpentyl-3-peroxy neohexanoate, 3-methylpentyl-3-peroxy neoheptanoate, 3-methylpentyl-3-peroxy neooctanoate, 3-methylpentyl-3-peroxy neononanoate, 3-methylpentyl-3-peroxy neodecanoate (3MPPND) and 3-methylpentyl-3-peroxy neotridecanoate.

3-Methylpentyl-3-peroxy alkanoates are known compounds. They are, for example, disclosed by Yurzhenko, T. I., et al., Zh. Org. Khim. 3(9), 1705–6 (1967). This publication, however, does not reveal any industrial application of the compounds.

The radical polymerization initiators used in the present invention can be produced in a high yield under reaction conditions similar to those of conventional processes. More specifically, the peroxide may be produced by reacting a carboxylic acid chloride with 3-methylpentyl-3-hydroperoxide in the presence of potassium hydroxide, sodium hydroxide or mixtures thereof at a temperature in the range of 0° to 30° C.

Examples of the carboxylic acids to be used as the starting material for the above-described carboxylic acid chloride include pivalic acid, neohexanoic acid, neoheptanoic acid, neooctanoic acid, neononanoic acid (such as Equacid® 9, ex Idemitsu Petrochemical Co., Ltd.), neodecanoic acid and neotridecanoic acid (such as Equacid® 13, ex Idemitsu Petrochemical Co., Ltd.).

The 3-methylpentyl-3-peroxy alkanoates to be used in the present invention may be prepared in the form of a solution by adding an isoparaffinic aliphatic hydrocarbon (such as IP-1620 Solvent, ex Idemitsu Petrochemical Co., Ltd.) to the reaction system, or a pure 3-methylpentyl 3-peroxy alkanoate may be synthesized and later diluted with a solvent.

The radical polymerization initiator of the formula (I) may be used in the present invention in combination with other radical polymerization initiators in order to attain a uniform polymerization velocity.

Examples of such other radical polymerization initiators include peroxy dicarbonates such as diisopropylperoxy dicarbonate (IPP), di(2-ethylhexyl)peroxy dicarbonate (EHP), and di(sec-butyl)peroxy dicarbonate (SBP); peroxy esters such as t-butylperoxy pivalate (TBPP), t-butylperoxy neodecanoate (TX23), and α-cumylperoxy neodecanoate (CND); diacyl peroxides such as diisobutyryl peroxide (IB), dilauroyl peroxide (LP), and bis-3,5,5-trimethylhexanoyl peroxide (TX36); peroxides such as acetyl cyclohexylsulfonyl peroxide (ACSP); and azo compounds such as azobisisobutyronitrile (AIBN).

Examples of the monomers usable in the process of the present invention include vinyl chloride, vinylidene chloride, vinyl acetate, and methyl methacrylate, and mixtures thereof, as well as other monomers copolymerizable there with, such as ethylene, propylene, styrene, acrylic acid, acrylic ester, methacrylic acid, and methacrylic ester.

In the present invention, polymerization is conducted by any conventional process, except that a specified radical polymerization initiator is used. The amount of the radical polymerization initiator, which varies depending on the polymerization temperature, the capacity for removing the heat of polymerization, and, when applicable, the kind of comonomer to be used, is usually 0.002 to 2.0 parts by weight, preferably 0.005 to 1.0 parts by weight, based on 100 parts by weight of monomers present.

When the amount of radical polymerization initiator used is below 0.002 parts by weight, the polymerization velocity and conversion are too low, so that the polymerization will not be completed. When the amount of radical polymerization initiator exceeds 2.0 parts by weight, controlling the polymerization velocity becomes difficult and may lead to a runaway polymerization reaction. The amount of other radical polymerization initiator to be used in combination with the radical polymerization initiator of the present invention must be such that the effect of the radical polymerization initiator of the present invention will be not inhibited.

The polymerization temperature is usually 20° to 75° C., preferably 30° to 70° C. When it is below 20° C., the polymerization time becomes too long. However, when it exceeds 75° C., the radical polymerization initiator is spent in the initial stage of the polymerization, making it difficult to attain a high conversion. In order to reduce the amount of unreacted monomer, however, it is also possible to conduct polymerization in the temperature range of 20° to 75° C. and then elevate the temperature above 75° C. (up to about 130° C.) to complete the polymerization.

The polymerization may be conducted by any of the suspension, solution, emulsion and bulk polymerization processes, but is not limited in any respect other than that the radical polymerization initiator of the above formula (I) is used in the present invention.

The invention will be further illustrated by the following examples which are not to be construed as limiting the invention in any way. The scope of the invention is to be determined from the claims appended hereto.

EXAMPLES 1 TO 3 AND COMPARATIVE EXAMPLES A TO I

Suspension Polymerization of Vinyl Chloride 2060 parts by weight of deionized water, 140 parts by weight of a 1.0% aqueous polyvinyl alcohol solution (prepared by using deionized water) and the radical polymerization initiators listed in Table 1 were fed to a 5-1 stainless steel autoclave. Deaeration and purging with nitrogen gas were repeated three times.

Then 1100 parts by weight of vinyl chloride were fed to the autoclave, which was hermetically sealed. The polymerization was conducted at the temperature given in Table 1 for 6 hours. The conversion (%) was monitored by the butane tracer method and read every 2 hours.

After completion of the polymerization reaction, unreacted monomer was removed and the obtained polymer was washed twice with water and then dried at 60° C. The obtained polymer was subjected to the following tests.

INITIAL COLOURATION TEST AND ORGANOLEPTIC ODOUR TEST 50 parts by weight of dioctylphthalate and 4 parts by weight of tribasic lead phosphate were added to 100 parts by weight of the obtained vinyl chloride polymer and the resulting composition was kneaded on a roll at 160° C. for 5 minutes and then pressed at 160° C. for 3 minutes to form a sheet. The extent of colouration of the sheet was observed and, at the same time, the sheet was smelled to compare its odour to that of the other sheets. The test results are summarized in Table 1.

TABLE 1

| Ex. | Pol. temp. (°C.) | pol. initiator kind | amount* | monomer conv. (%) 2 h | 4 h | 6 h | hue | odor |
|---|---|---|---|---|---|---|---|---|
| 1 | 42 | 3MPPND | 0.180 | 14 | 54 | 88 | none | none |
| A | 42 | THPND | 0.180 | 11 | 40 | 78 | none | none |
| B | 42 | CND | 0.200 | 15 | 55 | 84 | none | very weak |
| C | 42 | KD-12 | 0.200 | 18 | 59 | 85 | none | none |
| D | 42 | ASCP | 0.200 | 23 | 68 | 75 | faint yellow | none |
| 2 | 57 | 3MPPND | 0.064 | 23 | 79 | 91 | none | none |
| 3 | 57 | 3MPPND IB | 0.044 0.020 | 30 | 80 | 90 | none | none |
| E | 57 | THPND | 0.064 | 16 | 70 | 88 | none | none |
| F | 57 | CND | 0.071 | 30 | 77 | 86 | none | very weak |
| G | 57 | KD-12 | 0.070 | 25 | 79 | 88 | none | none |
| H | 57 | TX23 | 0.057 | 12 | 60 | 86 | none | none |
| I | 57 | EHP | 0.078 | 17 | 77 | 88 | none | none |

*amounts are given in parts by weight, based on 100 parts by weight of monomers present 3MPPND: 3-methylpentyl-3-peroxy neodecanoate
THPND: 2-methylpentyl-2-peroxy neodecanoate
CND: α-cumylperoxy neodecanoate
KD-12: 2,4,4-trimethylpentyl-2-peroxy neodecanoate
ASCP: acetyl cyclohexylsulfonyl peroxide
IB: diisobutyryl peroxide
TX23: t-butylperoxy neodecanoate
EHP: di(2-ethylhexyl)peroxy dicarbonate It is clear from Table 1 that the radical polymerization initiator 3-methylpentyl-3-peroxy neodecanoate (3MPPND) used in the present invention unexpectedly has a higher polymerization velocity and gives a higher monomer conversion than 2-methylpentyl-2-peroxy neodecanoate (THPND), which is a structural isomer thereof, while its velocity and the resulting conversion are equivalent or superior to that of 2,4,4-trimethylpentyl-2-peroxy neodecanoate (KD-12), and that the polymerization time can be shortened.

It has also been found that polymers obtained by the present invention are superior to those obtained by using an ordinary radical polymerization initiator in both hue and odour.

EXAMPLE 4 AND COMPARATIVE EXAMPLE J

Polymerization of Methyl Methacrylate 2.0 g of methyl methacrylate containing 0.30 parts by weight of 3-methylpentyl-3-peroxy neodecanoate (3MPPND), based on 100 parts by weight of monomers present, were poured into an ampoule. After the replacement of air with a nitrogen gas under cooling with dry ice, the ampoule was hermetically sealed and polymerization was conducted in an oil bath at 60° C. for 2 hours.

According to quantitative analysis of the monomer remaining in the obtained polymer by gas chromatography, the conversion was 97.7%. The weight-average and number-average molecular weights determined by gel permeation chromatography were 497 200 and 159 400, respectively.

The polymerization process was repeated, except that 3MPPND was replaced with 0.30 parts by weight of 2-methylpentyl-2-peroxy neodecanoate (THPND). The conversion was 94.3%, while the weight-average molecular weight was 533 900 and the number-average molecular weight was 161 800.

Comparing the results obtained in Example 4 with those of Comparative Example J, it is apparent that when the radical polymerization initiator of the present invention is used, the conversion is surprisingly increased and the productivity improved.

EXAMPLE 5 AND COMPARATIVE EXAMPLE K

Polymerization of Vinyl Acetate 80 parts by weight of vinyl acetate which had been subjected to simple distillation and 20 parts by weight of methanol were fed to a glass reactor provided with a stirrer, a thermometer, and a reflux condenser. After oxygen was removed by bubbling nitrogen gas through the reaction mixture, 0.004 parts by weight of 3-methylpentyl-3-peroxy pivalate (3MPPP) were added thereto as the radical polymerization initiator, and polymerization was conducted for 7 hours while the internal temperature was kept at 60° C. The conversion and the degree of polymerization of the obtained polymer were 73.4% and 2130, respectively.

A 10% solution of sodium hydroxide in methanol was added to the polyvinyl acetate thus obtained to conduct saponification at 30° C. for 3 hours to obtain polyvinyl alcohol. The degree of polymerization of the obtained polyvinyl alcohol was 1740.

The polymerization process was repeated except that 3MPPP was replaced with 0.004 parts by weight of 2-methylpentyl-2-peroxy pivalate (THPP). The conversion of vinyl acetate was 69.6% and the degree of polymerization was 2210. The degree of polymerization of the polyvinyl alcohol obtained after saponification was 1790.

Comparing the results obtained in Example 5 with those of Comparative Example K, it is apparent that the conversion can be improved by using the radical polymerization initiator of the present invention.

As a reference, the half-lives of 3-methylpentyl-3-peroxy alkanoates used in the present invention are given in Table 2 in comparison with those of other radical polymerization initiators (concentration: 0.2 mole/l, in benzene).

TABLE 2

| pol. initiator | 10-hour half life temp. (°C.) |
|---|---|
| TBPP | 57 |
| THPP | 53 |
| 3MPPP* | 52 |
| TX23 | 47 |
| EHP | 44 |
| THPND | 40 |
| 3MPPND* | 39 |
| CND | 38 |

TABLE 2-continued

| pol. initiator | 10-hour half life temp. (°C.) |
|---|---|
| KD-12 | 38 |
| ACSP | 36 |
| IP | 33 |

*initiator of the invention

We claim:

1. A process for (co)polymerizing vinyl monomers in the presence of a radical polymerization initiator, wherein said radical polymerization initiator is a 3-methylpentyl-3-peroxy alkanoate of the formula (I)

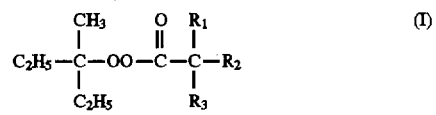

wherein $R_1$, $R_2$ and $R_3$ represent alkyl groups each having at most 9 carbon atoms with the proviso that the total number of carbon atoms of $R_1$, $R_2$ and $R_3$ is at most 11, said 3-methylpentyl-3-peroxy alkanoate being employed in an amount of 0.002 to 2.0 parts by weight, based on 100 parts by weight of monomers present, said process being carried out at a temperature above 20° C.

2. The process of claim 1 wherein said radical polymerization initiator is used in an amount of 0.005 to 1.0 parts by weight, based on 100 parts by weight of monomers present.

3. The process of claim 1 wherein said radical polymerization initiator is selected from the group of 3-methylpentyl-3-peroxy pivalate, 3-methylpentyl-3-peroxy neohexanoate, 3-methylpentyl 3-peroxy neoheptanoate, 3-methylpentyl-3-peroxy neooctanoate, 3-methylpentyl-3-peroxy neononanoate, 3-methylpentyl-3-peroxy neodecanoate, and 3-methylpentyl-3-peroxy neotridecanoate.

4. The process of claim 3 wherein said radical polymerization initiator is selected from 3-methylpentyl-3-peroxy pivalate or 3-methylpentyl-3-peroxy neodecanoate.

5. The process of claim 1 wherein at least part of said process is carried out at a temperature between 20° to 75° C.

6. The process of claim 1 wherein said process is carried out in the presence of a second radical polymerization initiator.

7. The process of claim 6 wherein said second radical polymerization initiator is selected from the group consisting of diisopropylperoxy dicarbonate, di(2-ethylhexyl) peroxy dicarbonate, di(sec-butyl)peroxy dicarbonate, t-butylperoxy pivalate, t-butylperoxy neodecanoate, α-cumylperoxy neodecanoate, diisobutyryl peroxide, dilauroyl peroxide, bis-3,5,5-trimethylhexanoyl peroxide, acetyl cyclohexylsulfonyl peroxide, and azobisisobutyronitrile.

* * * * *